J. BURT.
APPARATUS FOR PURIFYING FURNACE GASES
No. 188,852. Patented March 27, 1877.
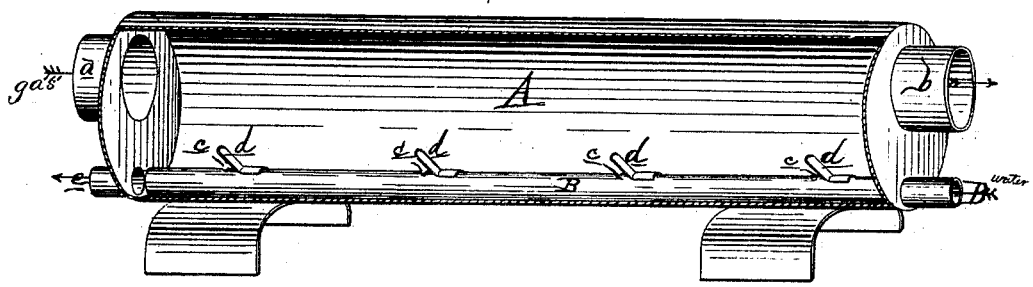
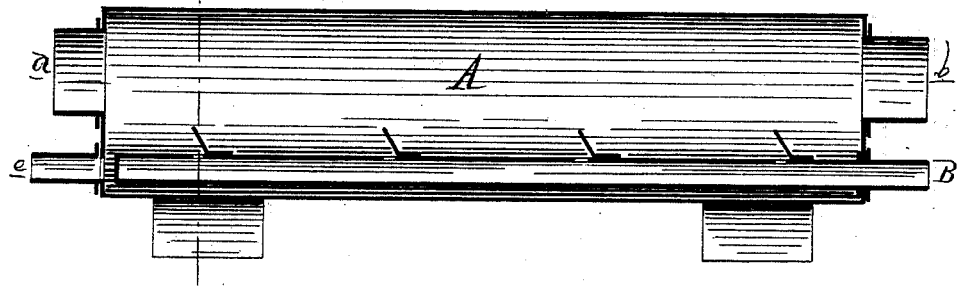
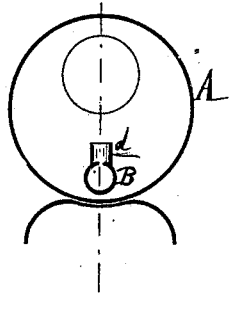

UNITED STATES PATENT OFFICE.

JOHN BURT, OF DETROIT, MICHIGAN.

IMPROVEMENT IN APPARATUS FOR PURIFYING FURNACE-GASES.

Specification forming part of Letters Patent No. 188,852, dated March 27, 1877; application filed October 9, 1876.

*To all whom it may concern:*

Be it known that I, JOHN BURT, of Detroit, in the county of Wayne and State of Michigan, have invented an Improved Apparatus for Purifying Furnace-Gases, of which the following is a specification:

My invention has for its object to provide a means for eliminating dust and ash from the gases of blast and other furnaces preparatory to delivering the same to the boiler-furnaces or to the hot-blast stoves; and to this end it consists in the combination, with a horizontal receiver, through which said gases pass, of a perforated tube, lying in the bottom thereof, and provided with a deflector over each perforation, so as to spread out and deflect the issuing jet to an angle opposing the course of the gases through the receiver, to permeate the gases and precipitate the impurities, which pass out with the water.

Figure 1 is a perspective view, with a portion of the shell of the receiver broken away to show the interior arrangement. Fig. 2 is a longitudinal vertical section. Fig. 3 is a cross-section through the tube at one of the perforations, showing the jet-deflector.

In the drawing, A represents a horizontal receiver, having an inlet, *a*, at one end, and an exit, *b*, at the other.

The gases collected from the furnace enter the receiver more or less charged with dust and ash, which tend to clog the flues of the hot-blast stoves; or if the gases be burned under steam-boilers these impurities are deposited on the surface thereof, lessening its steam-generating capacity, and in many cases thereby deranging the working of the furnace.

B is a water-tube, entering the receiver at the discharge end, near the bottom, and extending nearly to the other end. The inner end is stopped, and the upper surface is perforated at intervals with apertures *c*, over each of which is a deflector, *d*, inclined in the direction of the inlet *a*, and curved in cross-section, so as to spread out the jet of water to cover the entire cross-section of the receiver, being also inclined, to strike the gas-current at an angle. After striking the walls of the receiver the jets again fall through the current of gas, taking up and precipitating the impurities, which flow off with the water through an outlet, *e*, while the purified gases pass off through the outlet *b* to the boiler-furnace or to the hot-blast stoves, as the case may be.

What I claim as my invention is—

The combination, with the receiver A, having the inlet *a* and exit *b*, of the water-tube B in the bottom of the said receiver, the deflectors *d*, and the outlet *e*, all constructed and arranged substantially as described and shown.

JOHN BURT.

Witnesses:
    H. S. SPRAGUE,
    G. W. ANDREWS.